(12) United States Patent
Nelke et al.

(10) Patent No.: US 9,870,419 B2
(45) Date of Patent: *Jan. 16, 2018

(54) APPLICATION CACHE PROFILER

(75) Inventors: Sebastian Nelke, Boeblingen (DE); Martin Oberhofer, Boeblingen (DE); Yannick Saillet, Boeblingen (DE); Jens Seifert, Boeblingen (DE)

(73) Assignee: International Business Machines Corporation, Armonk, NY (US)

(*) Notice: Subject to any disclaimer, the term of this patent is extended or adjusted under 35 U.S.C. 154(b) by 666 days.

This patent is subject to a terminal disclaimer.

(21) Appl. No.: 13/407,712

(22) Filed: Feb. 28, 2012

(65) Prior Publication Data

US 2012/0173823 A1    Jul. 5, 2012

Related U.S. Application Data

(62) Division of application No. 12/983,044, filed on Dec. 31, 2010.

(51) Int. Cl.
*G06F 17/30* (2006.01)
*G06F 7/00* (2006.01)

(52) U.S. Cl.
CPC .............................. *G06F 17/30592* (2013.01)

(58) Field of Classification Search
None
See application file for complete search history.

(56) References Cited

U.S. PATENT DOCUMENTS

2006/0229899 A1* 10/2006 Hyder et al. ....................... 705/1
2007/0233935 A1* 10/2007 Amiri et al. .................... 711/100
2008/0040672 A1*  2/2008 Appleyard et al. ............ 715/742
2009/0119275 A1*  5/2009 Chen et al. ....................... 707/5
2009/0319295 A1* 12/2009 Kass-Hout et al. .............. 705/2
2011/0289289 A1* 11/2011 Leshinsky et al. ............ 711/162

* cited by examiner

*Primary Examiner* — Usmaan Saeed
*Assistant Examiner* — Yu Zhao
(74) *Attorney, Agent, or Firm* — Steven M. Greenberg, Esq.; CRGO Law

(57) ABSTRACT

In an embodiment of the invention, a method for data profiling incorporating an enterprise service bus (ESB) coupling the target and source systems following an extraction, transformation, and loading (ETL) process for a target system and a source system is provided. The method includes receiving baseline data profiling results obtained during ETL from a source application to a target application, caching the updates, determining current data profiling results within the ESB for cached updates, and triggering an action if a threshold disparity is detected upon the current data profiling results and the baseline data profiling results.

4 Claims, 3 Drawing Sheets

APPLICATION CACHE PROFILER

CROSS-REFERENCE TO RELATED APPLICATIONS

This application is a Divisional of U.S. application Ser. No. 12/983,044, filed Dec. 31, 2010, currently pending, the entirety of which is incorporated herein by reference.

BACKGROUND OF THE INVENTION

Field of the Invention

The present invention relates to data profiling following extraction, transformation, and loading (ETL) processing for a source and target system, more particularly, it applies to data profiling within an enterprise service bus (ESB) coupling the source and target systems.

Description of the Related Art

Extract, transform, and load (ETL) is a data movement process between systems, in many cases between a relational source and target databases. A very common usage is the introduction of a new data warehousing environment where data is extracted from operational source systems, transformed to a common model, cleansed, and then loaded into the relational database of the data warehouse for the initial population of the data warehouse. There are many other use cases beyond the example provided, including use in the introduction of a new application in the IT environment.

The first part of an ETL process involves extracting the data from the source systems into a persistency for further processing. The persistency can be flat files, but are typically relational databases. The persistency has typically three major areas: (1) a staging area (STG) modeled after the sources, (2) an alignment area (ALG), which is typically modeled as closely as possible to the target, but might have some changes to be able to accommodate all records from all sources, and (3) a preload area (PLD), which is modeled exactly after the target.

Data profiling can be applied in the STG area, which has a sub-area per source system. If data profiling is applied to the STG area, the data profiling results would be per source system. For example, frequency distribution statistics in such a case would only count the distribution of values per source system. If the data profiling is applied to ALG, the frequency distribution for values would lead to statistics across all records for all sources. In both cases, data profiling analyzes value distributions within a column (=an attribute) as well as patterns in the data. Furthermore, data profiling can check if the values found comply with certain constraints and business rules often across several columns— this type of data profiling is known as semantic profiling. Note that data profiling is IO-intensive, which is why it is typically not applied on the source systems directly, but rather on the persistency used by the ETL process.

Once the data quality issues are identified through data profiling, the transforming operations are applied, including data cleansing logic and, finally, to transform the data into the data model of the preload area. From the preload area, the load step of the ETL process is performed by loading the data into the target system. Data cleansing logic is a subset of the transformation operations and is used to correct the incorrect data identified during data profiling.

There are two key objectives in the transform step. The first objective is to condition the data in such a way, that the data is accepted by the data model and processing routines on the load interface used in the target system. The second objective is to fix all data quality issues of data coming from the source system before loading it into the target system so that no business process or purpose of the target system is negatively affected by low quality data.

In conventional scenarios, like with new application introduction, the data moved from the source to the target system is no longer monitored after go-live of the application with data profiling. Thus, even if the new application or the data warehouse might initially have had clean data, the data quality might degrade over time without being noticed, because in the near real-time or real-time integration with an enterprise service bus (ESB) connecting the source and target systems after go-live no data profiling is applied. In addition, ETL projects can be extremely labor intensive and time consuming. Performing an ETL process often to fix data quality issues, though, is not realistic, because the ETL process is very costly and causes an unacceptable amount of downtime for both the source and target systems. The net result is that data profiling is not deployed on a regular basis so that changes in source applications after the data is moved to the target systems through the ESB can cause data quality issues that remain undetected.

BRIEF SUMMARY OF THE INVENTION

Embodiments of the present invention address deficiencies of the art in respect to data profiling during data movement in an ESB and provide a novel and non-obvious method. In an embodiment of the invention, a method for in-memory cache data profiling is provided and includes comparing current profiling results with baseline data profiling results obtained during ETL for the initial load of a target system. The method can further include caching updates to a source application in an ESB detected through monitoring messages in the ESB, determining current data profiling results for the cached updates, and triggering an action if a predefined condition is not satisfied upon comparing the current data profiling results and the baseline data profiling results.

Additional aspects of the invention will be set forth in part in the description which follows, and in part will be obvious from the description, or may be learned by practice of the invention. The aspects of the invention will be realized and attained by means of the elements and combinations particularly pointed out in the appended claims. It is to be understood that both the foregoing general description and the following detailed description are exemplary and explanatory only and are not restrictive of the invention, as claimed.

BRIEF DESCRIPTION OF THE SEVERAL VIEWS OF THE DRAWINGS

The accompanying drawings, which are incorporated in and constitute part of this specification, illustrate embodiments of the invention and together with the description, serve to explain the principles of the invention. The embodiments illustrated herein are presently preferred, it being understood, however, that the invention is not limited to the precise arrangements and instrumentalities shown, wherein.

DETAILED DESCRIPTION OF THE INVENTION

Embodiments of the invention provide for data profiling in an ESB. In accordance with an embodiment of the invention, an ETL process can be performed with data extracted from a source application and profiled to form a baseline data profile. Subsequently, updates to data in the source application can be detected in transit from the source application to a target application in an ESB coupling the source application to the target application. The detected updates can be copied into a cache of the ESB, and data profiling can be performed on the data producing the updated data profile. Thereafter, in response to detecting a threshold disparity between the data profiles, a message can be transmitted to a data steward notifying the data steward of a threshold trend in data quality for data in the source application. In this way, the data profiling function within the ESB is ongoing. This avoids potentially unacceptable downtime of the source and target systems and/or negatively affected target systems (due to low quality data making it into the target system undetected).

Figure 1:
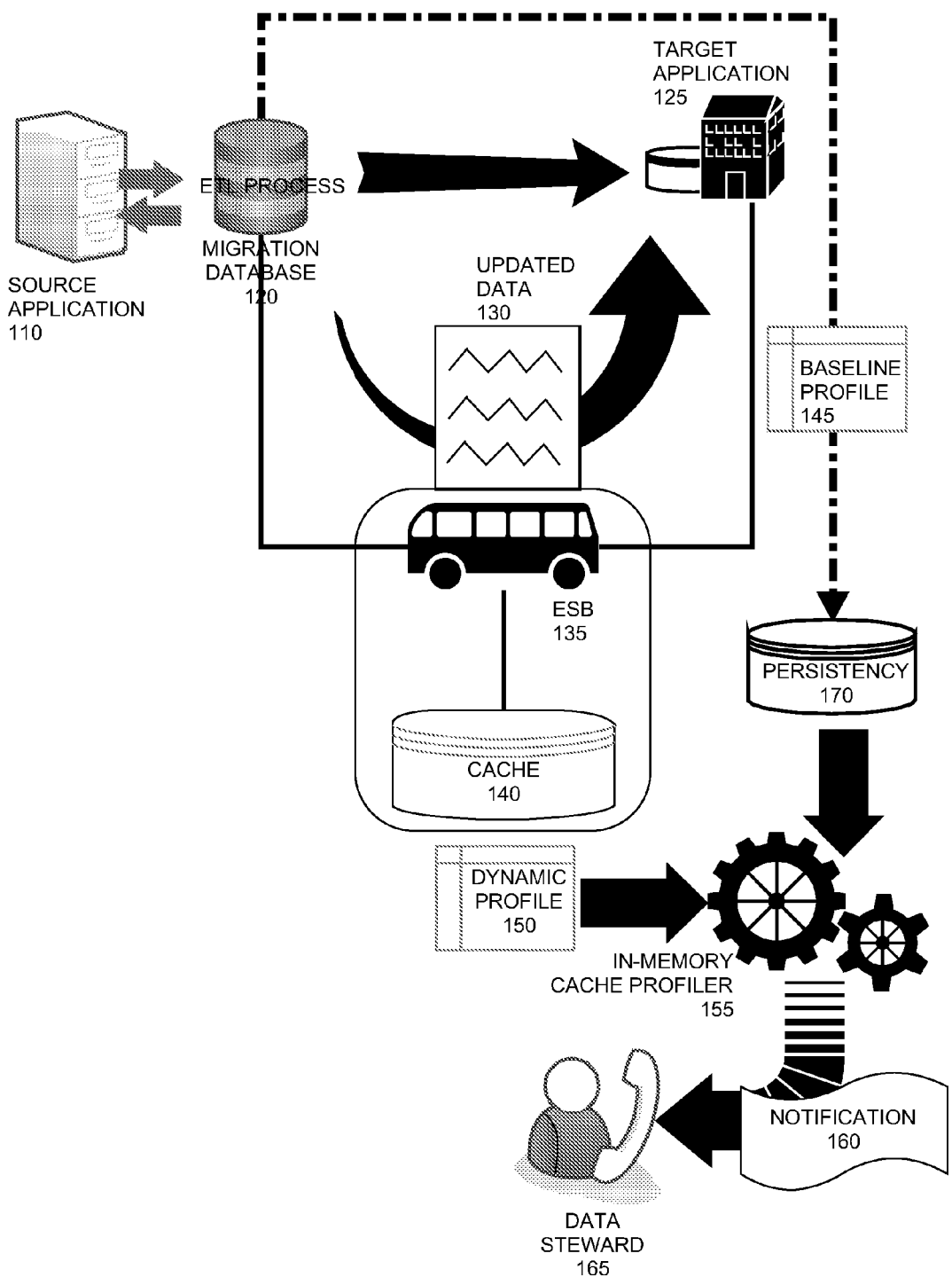
FIG. 1 is a pictorial illustration of a process for data profiling in an ESB.

In further illustration, FIG. 1 pictorially shows a process for data profiling in an ESB. As shown in FIG. 1, data from a source application 110, undergoes ETL processing targeted to a target application 125. A baseline profile 145 can be extracted from a persistency 170, where the baseline profile is stored from the initial load of the target application 125 during ETL. The persistency 170 can be a database or a flat file. ETL processing can occur on a database 120, such as a migration database, and can be completed before profiling in an ESB 135 starts. Subsequent to the ETL process, as the source application 110 is modified and the modifications are transmitted onto an ESB 135 to a target application 125, the updated data 130 can be copied to a cache 140 on the ESB 135. Of note, knowledge that the source application 110 has been modified can be determined by monitoring messages in the ESB 135 for detecting updates for the source application 110. Data profiling can be performed on the copied updated data 130 in the cache 140 to form a dynamic profile 150 (an updated data profile) by applying profiling algorithms embodied in in-memory cache profiler logic 155. Furthermore, in-memory cache profiler logic 155 can compare the baseline profile 145 and the dynamic profile 150. As a result of the comparison, in-memory profile logic 155 can trigger an action depending on whether a threshold disparity has been detected between the baseline profile 145 and the dynamic profile 150.

For example, upon determining that a threshold of changes between the baseline profile 145 and the dynamic profile 150 are met, in-memory cache profiler logic 155 can send a notification 160 to a data steward 165. The required number of threshold changes is not specifically defined, but can be defined according to the needs or requirements of the system. The specific differences compared in the baseline profile 145 and the dynamic profile 150 are not specifically defined, but can include comparing specific differences in the profiles or be based on the number of changes found between each profile.

In-memory cache profiler logic 155 might also apply profiling algorithms on individual records in messages flowing through the ESB. An example would be a business rule representing an instance of semantic profiling. In this case, the threshold defining the disparity would be defined in the context of how much the record deviates from the conditions set forth by the business rule. If the disparity is substantial enough, a notification 160 to a data steward 165 can be triggered. When profiling on the individual record level, as in semantic profiling, the profiling algorithm can be applied without having the need for caching.

Figure 2:
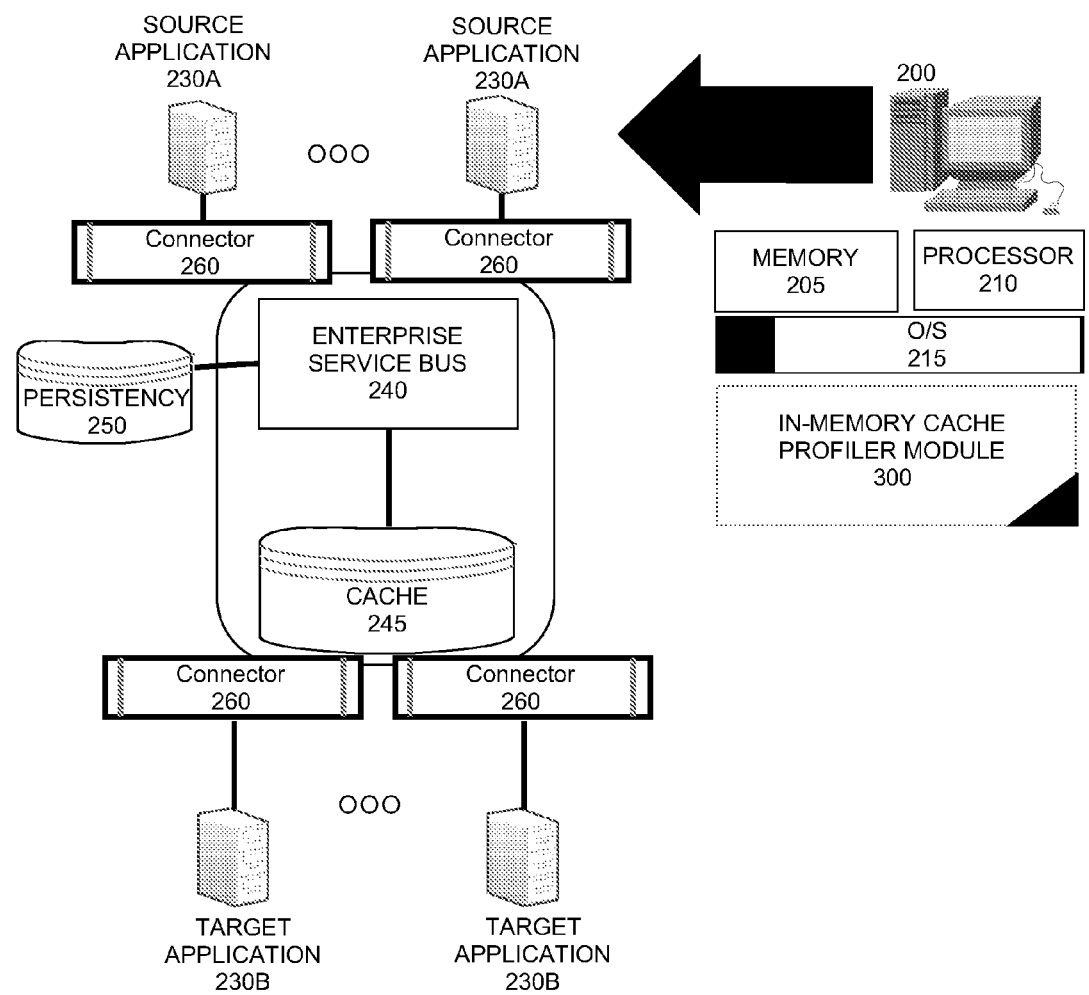
FIG. 2 is a schematic illustration of a data profiling system in an ESB; and, FIG. 3 is a flow chart illustrating a process for data profiling in an ESB.

The process described in connection with FIG. 1 can be implemented in a system as shown in FIG. 2. In further illustration, FIG. 2 schematically shows a system to configure data profiling in an ESB following the creation of a baseline profile created during the initial data movement of data from one source system to at least one target system during ETL. Data profiling in the ESB 240 can include a computer 200. The computer 200 can include at least one processor 210 and memory 205 supporting the execution of an operating system (O/S) 215. The O/S 215 in turn can support the in-memory profiling of data changes moved through the ESB 240 from at least one source application 230A that targets at least one target application 230B. The source and target application 230A and 230B can include applications where access to the data is only available through application connectors.

Of note, an in-memory cache profiler module 300 can execute in memory 205 of the computer 200 and can be coupled to the ESB 240. Of note, the in-memory cache profiler can be employed on the same hardware as the ESB 240 or on separate hardware. The ESB 240 can be configured to have at least one cache 245. For each source/target system there may be a separate cache 245 or there may be one cache with logical grouping of memory in the same cache per source/target system. In addition, the cache 245 for the source system can be in the ESB 240 itself, as shown in FIG. 2, or the cache 245 can be embodied in a connector 260. The cache is usually embodied in a connector 260 when the connector 260 shares the ESB runtime environment. Optionally, there can be a user interface (UI) or a command line interface to configure each cache.

The source application 230A and the target application 230B can be connected to the ESB 240 via a connector 260. The type of connector 260 required depends on the source application 230A or target application 230B in use in the source/target system. For simpler source applications 230A, where data can be accessed directly on the database level, a connector, such as a Java database connectivity (JDBC) Connector can be used. For more complex source applications 230A, an enterprise application connector can be used. There can be multiple source applications 230A and multiple target applications 230B. The ESB 240 can communicate over a global communications network, such as the Internet, managing access thereto by different computing devices, including tablets, personal digital assistants (PDAs), and computers. The communications network is not limited to the Internet, but can include wireless communications, Ethernet, 3G, and 4G.

The in-memory cache profiler module 300 can include program code, which when executed by at least one processor 210 of the computer 200 connected to the ESB 240, extracts baseline data profiling results from the persistency 250 obtained from data profiled during an ETL process of a source/target system. The computer 200 can be any computing device. Of note, a separate ETL process, having a computer with at least one processor, memory, and an O/S, creates the baseline profile during the initial data movement from at least one source system to at least one target system. The baseline profile is stored in the persistency 250. Once at least one target system goes live and at least one source system is connected to the at least one target system through the ESB 240, data profiling in the ESB 240 can be applied. The in-memory cache pro filer module 300 can further include program code to monitor messages in the ESB 240 for detecting updates in the source application 230A. Upon detecting updates in the source application 230A, the module 300 can include program code to cache the updates on the cache 245 of the ESB 240.

Each cache 245 sending data to the target application 230B can be defined by defining tables in the source application 230A for which real-time profiling should be enabled. The size of the cache 245 can be defined by any process, including defining the total size of the cache 245 and splitting the total assigned memory cache autonomically into chunks for each table or defining how much memory each table in each cache can be used. Note that with the term table refers generically to a data structure holding the data, which can be, for example, a relational table structure or a table structure using columnar database techniques. The configuration of each cache 245 can be done through a UI or a command line interface. When a cache 245 is enabled, a listener is also enabled on the interface between the connector 260 and the ESB 240 so that whenever the connectors 260 send a message into the ESB, a copy of the message is picked up by the cache 245.

Optionally, a metadata repository for storing the table definitions for the required tables can be coupled to the ESB 240. The metadata repository can be physical or logical, and there can be more than one metadata repository. The metadata repository can store the metadata for the tables in which the ESB performs profiling, or it can provide programmatic metadata access for the profiler component in the ESB to the source and target metadata, or a combination of both. In other words, metadata can be captured during the ETL process or it can be pulled from the source and target applications whenever needed, or a combination of both.

The module 300 can further include program code to determine current data profiling results by creating an updated data profile (a dynamic profile or current data profile) from the extracted (updated) data on the cache 245. The profiling of the current data profile is not limited to a specific type of profiling algorithm, but can include profiling single records, as in business rule profiling (an example for such a business rule could be if attr1<18 (the age column) AND attr2=child (the profession) THEN attr3<10.000 Euro (the income column)), and profiling across multiple records, where the records are collected in the cache for a period of time, as in frequency distribution profiling. Upon the creation of an updated data profile, the in-memory cache profiler module 300 can include program code enabled to compare the baseline data profile and the dynamic profile to determine whether a threshold disparity has been detected.

The threshold can be defined in a schema, which can specifically be defined for use when comparing the baseline data profile and the current data profile. The schema can include threshold definitions based on time, number of rows seen, or any combination thereof. In addition, there can be a schema that defines a threshold for the permissible variation between baseline data profile results and current data profile results. The permissible variation can be defined as a percentage indicating how much the new measurements (the current data profile) can deviate from the original data (the baseline data profile).

Upon the detection of a threshold disparity, the module 300 can further include program code to trigger an action. For example, if a threshold number of changes is detected, the program code of the module 300 can be enabled to transmit a message to a data steward notifying the data steward of a threshold change in data quality for the data in the source application 230A. There may be multiple thresholds with different actions depending on how far the measurements (between the baseline data profile and the current data profile) deviate.

Optionally, a data governance application may be coupled to the ESB 240. If a data governance application exists, a detected threshold disparity can trigger data governance actions, which may include notifying the data steward or adding tasks for the data steward. Upon the notification of a data steward, the data steward can use the data governance application, for example, to update the baseline profile based upon the current profiling results, thus creating a new baseline profile. In this way, a result that was an exception in the original baseline profile becomes acceptable (the expected) as business needs change. For example, if a company originally has employees only residing in Germany, then any data indicating that an employee is living in China and not in Germany creates an error. But if the company, opens an office in China, then one would expect that the data would reflect employees living in China and in Germany. So what once was considered an error (living in China) is know expected; the data steward can update the baseline profile to reflect this business change.

Figure 3:
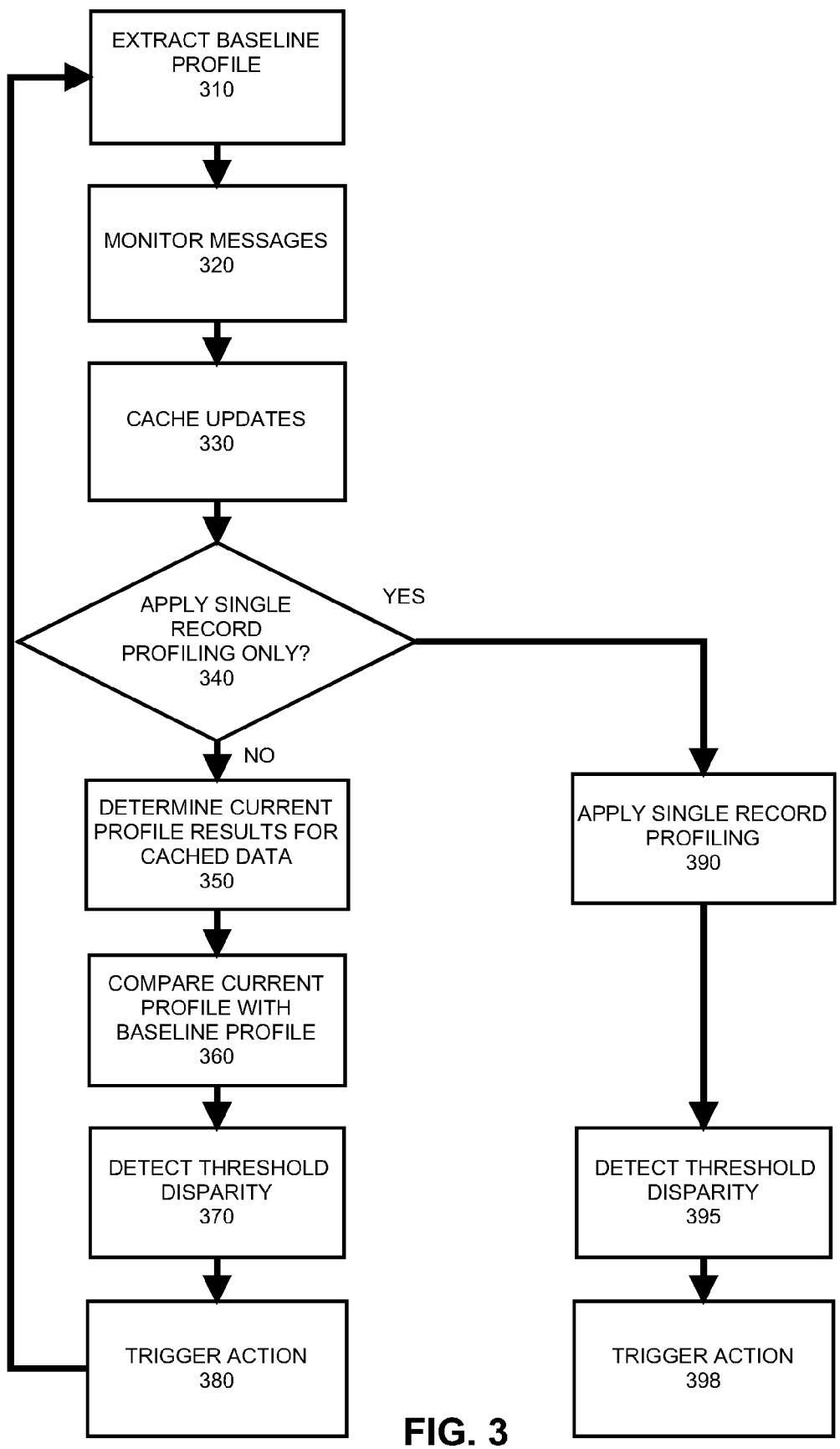

In even yet further illustration of the operation of the program code of the in-memory cache profiler module 300, FIG. 3 is a flow chart illustrating a process for data profiling in an ESB. Beginning in block 310, a baseline data profile can be extracted from a persistency. The persistency is coupled to an ESB and stores the baseline data profile generated during ETL processing for a source/target system. The persistency may be a database or a flat file. In block 320, messages in the ESB can be monitored to detect updates to the source application. Upon the detection of updates to the source application, the updates can be cached in the cache in the ESB, as shown in block 330. Then, a decision as shown in block 340 can be made as to whether or not only single record profiling algorithms have been selected during configuration of an in-memory cache profiler for a source system. Upon a negative determination (not only single record algorithms have been selected), the cached updates can be profiled, determining a current data profile, as indicated in block 350. The baseline data profile and the current data profile can be compared, as indicated in block 360.

In block 370, a threshold disparity can be detected between the baseline data profile and the current data profile. The threshold definition can be defined in a schema, which can specifically be defined for use when comparing the baseline data profile and the current data profile. The schema definition for the threshold is affected by parameters, such as time between two comparisons of a current profile versus a baseline profile, number of rows cached, etc. The reason why the disparity threshold needs to consider such parameters, such as time and number of rows cached, is that the more data values that are available (the more data that has been cached), the more reliable the statistics on frequency distribution, pattern distributions, etc. are.

The schema can also define threshold values for the permissible variation between baseline data profile results and current data profile results depending on the previously mentioned parameters. The permissible variation can be defined as a percentage indicating how much the new measurements (the current data profile) can deviate from the original data (the baseline data profile). Upon reaching the threshold disparity, an action can be triggered, as indicated in block 380. The triggered action is not limited, but can include notifying a data steward or triggering data governance actions. Optionally, there may be multiple thresholds with different actions depending on how far the measurements (between the baseline data profile and the current data profile) deviate. Note that once the actions are triggered, the process starts over for the next time window between comparison of current profile and baseline profile.

If the decision in block 340 is yes, then only single record profiling has to be applied. In this case, the record is analyzed right away as indicated in block 390. A typical example would be a business rule in the case of semantic profiling. Once the profiling on the record is completed, a threshold disparity detection can be done, as in block 395. If the derivation is too large, an action is triggered, as in block 398, which could mean notifying a data steward. Note that with single record profiling only, there is no time window, since each record is analyzed immediately once cached and no grouping of records occurs. Thus, there is no arrow pointing back to the starting point indicating the time window for which the updates are cached before the next profiling exercise occurs.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, radiofrequency, and the like, or any suitable combination of the foregoing. Computer program code for carrying out operations for aspects of the present invention may be written in any combination of one or more programming languages, including an object oriented programming language and conventional procedural programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention have been described above with reference to flowchart illustrations and/or block diagrams of methods, apparatus (systems) and computer program products according to embodiments of the invention. In this regard, the flowchart and block diagrams in the Figures illustrate the architecture, functionality, and operation of possible implementations of systems, methods and computer program products according to various embodiments of the present invention. For instance, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

It also will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks. The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

Finally, the terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

We claim:

1. A method for in-memory cache data profiling, comprising:
    executing an Extract Transfer Load (ETL) process in which data is first moved from a source database of a source application to a target database of a target application during which movement the data is extracted from the source database into a persistency comprising a staging area, an alignment area and a preload area, then transformed to a model that is common to both the source and target databases, and finally cleansed and loaded into the target database so as to initially populate a data warehouse;
    performing baseline data profiling on the extracted data in the persistency during ETL in order to produce baseline data profiling results; and,
    subsequent to the ETL,
        receiving in an enterprise service bus (ESB) updates to the source database and placing the updates in a cache memory on the ESB,
        determining whether multi-record profiling or only single record profiling has been selected for profiling cached updates,
        on condition that multi-record profiling is selected, performing data profiling on the updates in the cache on the ESB and determining current data profiling results for the cached updates and, comparing the current data profiling results for the cached updates to the baseline data profiling results, but otherwise performing single record profiling on the updates without comparing the current data profiling results for the cached updates to the baseline data profiling results, and
        triggering an action if a threshold disparity is detected based upon the current data profiling results.

2. The method of claim 1, wherein the action is a data governance action.

3. The method of claim 2, wherein the data governance action is integrated with at least one data governance application.

4. The method of claim 2, wherein the action is notifying a data steward.

* * * * *